United States Patent
Surawski

(10) Patent No.: US 8,074,932 B2
(45) Date of Patent: Dec. 13, 2011

(54) NEA DISTRIBUTION SYSTEM FOR OBIGGS APPLICATIONS

(75) Inventor: Eric Surawski, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 131 days.

(21) Appl. No.: 12/563,185

(22) Filed: Sep. 21, 2009

(65) Prior Publication Data

US 2011/0068231 A1    Mar. 24, 2011

(51) Int. Cl.
*B64D 37/32* (2006.01)
(52) U.S. Cl. ............... 244/135 R; 137/209; 137/571; 137/589
(58) Field of Classification Search ......... 244/135 B, 244/135 C, 135 R; 454/71–74; 137/209, 137/571, 589, 899.2
See application file for complete search history.

(56) References Cited

U.S. PATENT DOCUMENTS

| | | | |
|---|---|---|---|
| 4,968,219 A | 11/1990 | Fisher-Votava | |
| 4,979,362 A | 12/1990 | Vershure, Jr. | |
| 5,572,031 A | 11/1996 | Cooper et al. | |
| 6,547,188 B2 * | 4/2003 | Schmutz et al. | 244/135 R |
| 6,729,359 B2 | 5/2004 | Jones | |
| 6,739,359 B2 | 5/2004 | Jones et al. | |
| 7,509,968 B2 | 3/2009 | Surawski | |
| 2008/0017248 A1 * | 1/2008 | Massey et al. | 137/14 |

* cited by examiner

*Primary Examiner* — Tien Dinh
*Assistant Examiner* — Michael Kreiner
(74) *Attorney, Agent, or Firm* — Carlson, Gaskey & Olds, P.C.

(57) ABSTRACT

A method for creating ullage in a fuel tank includes the steps of porting NEA into a mixing chamber during descent, exposing the mixing chamber to ambient air and communicating a mixture of NEA and ambient air into the fuel tank. A complementary apparatus to the method includes a mixing chamber for receiving NEA during descent, a port for communicating ambient air with the mixing chamber during descent and a port for communicating a mixture of the NEA and the ambient to the fuel tank.

5 Claims, 2 Drawing Sheets

NEA DISTRIBUTION SYSTEM FOR OBIGGS APPLICATIONS

BACKGROUND

Modern aircraft typically have an inert gas generation-based fire and explosion prevention and/or suppression system. A system may also be known as an onboard inert gas generation system or "OBIGGS." In an OBIGGS system, nitrogen enriched air ("NEA") is mixing with air in a fuel tank. The mixture is commonly referred to as "ullage". Oxygen concentrations are diluted so that in an event, like combat or upon the occurrence of a spark, in which fuel might tend to ignite combustion is unlikely. NEA introduced in a fuel tank must be adequately mixing with existing ullage so that the oxygen concentration throughout the tank is low enough to minimize a probability of combustion.

Fuel tanks for larger aircraft, such as a Boeing 747® aircraft, typically have a fuel tank boundary in which wing tanks and a center tank are disposed. Surge tanks are placed in the wings outboard of the wing tanks to capture any sloshing the fuel tank might encounter when carrying out maneuvers. The surge tanks are located outboard of the wing tanks and return the sloshed fuel to the wing tanks by gravity. The fuel tanks are exposed to ambient pressure and allow air into the tanks through the surge tanks.

SUMMARY

According to a non-limiting embodiment, a method for creating ullage in a fuel tank includes the steps of porting NEA into a mixing chamber during descent, exposing the mixing chamber to ambient air and porting a mixture of NEA and ambient air into the fuel tank.

According to another non-limiting embodiment, a method for creating ullage in a fuel tank includes, during descent, porting NEA into a mixing chamber, exposing the mixing chamber to ambient air. If not in descent, the method includes the steps of porting a mixture of NEA and ambient air into the fuel tank and porting NEA to the tank during ascent and cruise.

According to further non-limiting embodiment, an apparatus for creating ullage in a fuel system includes a mixing chamber for receiving NEA during descent, a port for communicating ambient air with the mixing chamber during descent and, a port for delivering a mixture of the NEA and the ambient to the fuel tank if not in descent.

BRIEF DESCRIPTION OF THE DRAWINGS

These and other features of the present embodiment may be shown and best understood from the following specification and drawings.

DETAILED DESCRIPTION

Figure 1:
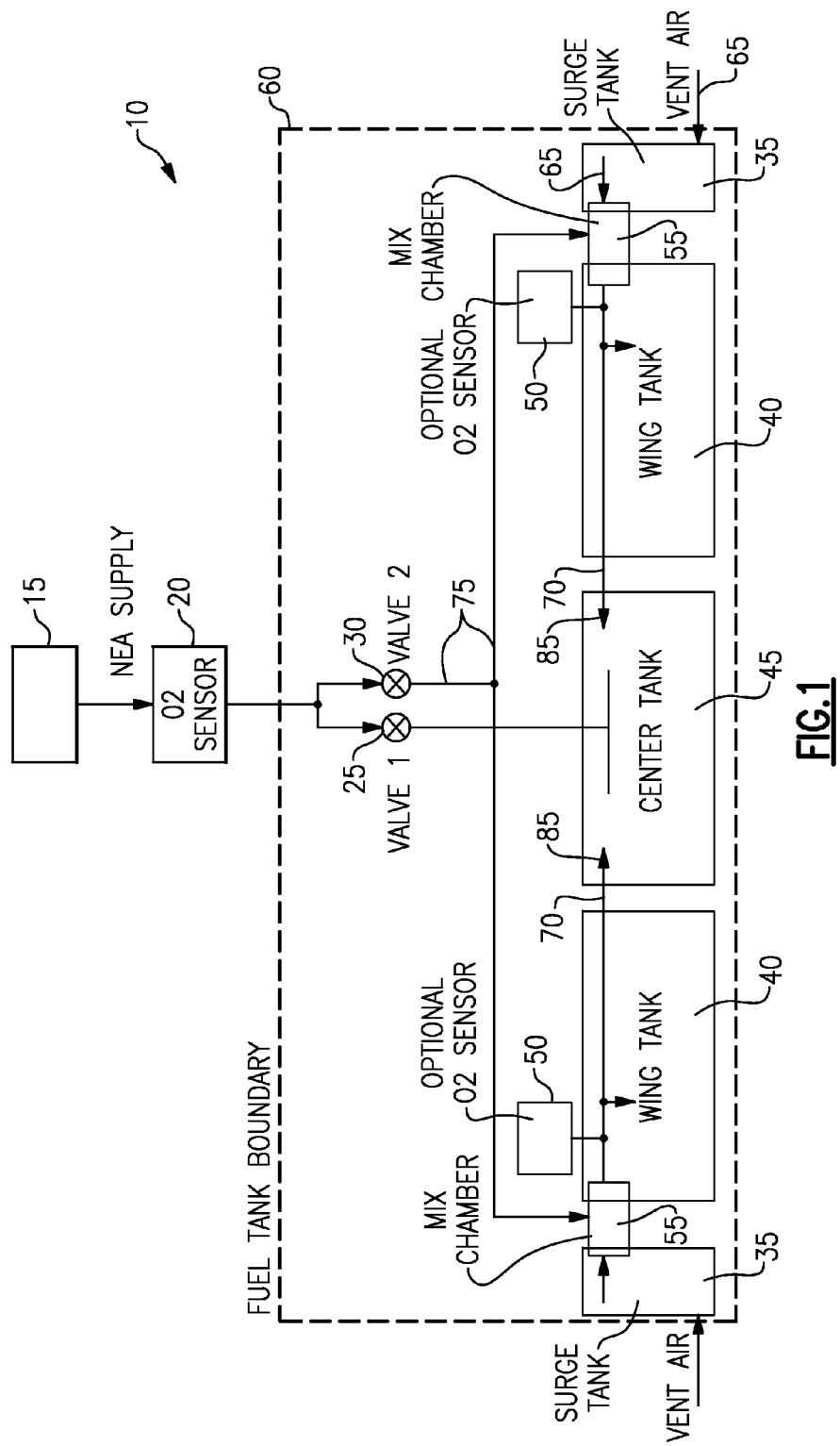
FIG. 1 is a schematic view of the NEA distribution system of the invention in a descent mode.

Referring now to FIG. 1, schematic drawing of an embodiment of an NEA distribution system 10 disposed within an aircraft (not shown) that is in a descent mode is shown. The NEA distribution system 10 includes an NEA supply 15, an oxygen sensor 20 for determining the amount of oxygen within supplied NEA, a pair of valves 25, 30, a pair of surge tanks 35, a pair of wing tanks 40, a center tank 45, a pair of optional $O_2$ sensors 50 and a pair of mixing chambers 55. While nitrogen is commonly used in an oxygen diluting system, other oxygen diluting gas, gasses or elements or combinations thereof with or without nitrogen may be used herein and still fall within the metes and bounds of this non-limiting embodiment. The term "NEA" shall hereby be defined herein to encompass such an oxygen depleting system.

The NEA distribution system 10 is then placed in a fuel tank boundary 60 in an area of an aircraft (not shown) in which fuel may occur. While it is intended that fuel remains within the tanks and the surge tanks, there is occasional leakage. An aircraft (not shown) is designed to be tolerant of small amounts of fuel within the fuel tank boundary.

During descent, pressure in the tanks 40, 45 is increasing as denser air (not shown) is entering from ambient through the surge tanks 35 into the wing 40 and center tanks 45 via openings 65 and 70. Before the air enters the wing tanks 40, it is mixing with NEA in the mix chambers 55 so that the ullage in the wings and center tank are at proper concentrations. Valve 30 is open and valve 25 is closed so that NEA passes to mix chambers 55 via piping 75 to be mixing with ambient air coming aboard through the surge tanks 35. $O_2$ sensors 50 are placed inside the wing tanks 40 so that the NEA distribution system 10 can determine whether proper concentrations of $O_2$ exist in the ullage in each wing tank 40. Because of increasing pressure in the wing tanks, there is a natural flow through line 70 towards the center tank as the NEA mix enters the wing tanks 40 thereby achieving a proper amount of ullage in the center tank 45 as well. The flow of ullage and air in the tanks are indicated by the arrowheads 85.

Figure 2:
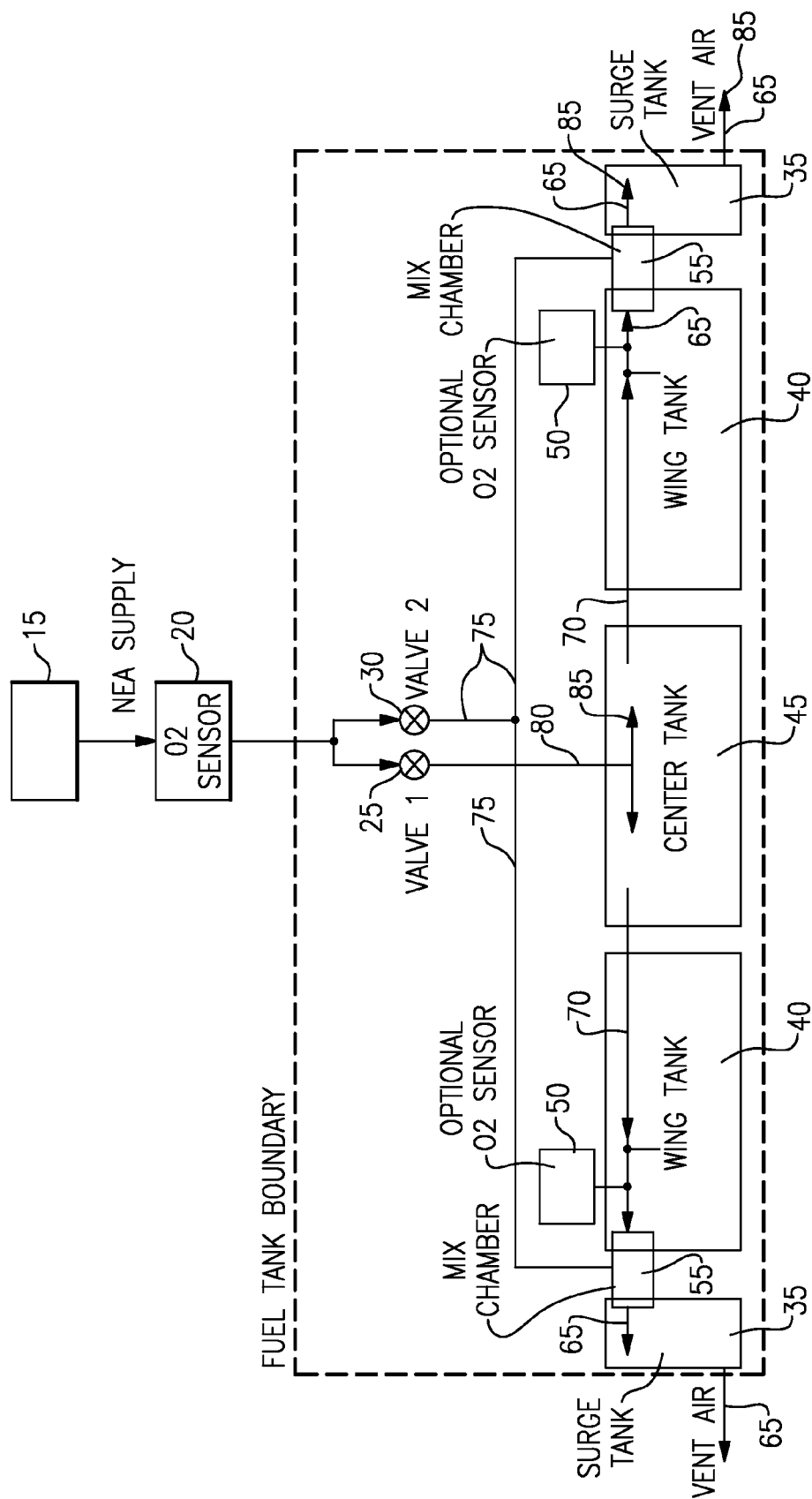
FIG. 2 is a schematic view of the NEA distribution system of the invention in an ascent or level flight environment.

Referring now to FIG. 2, the system is shown in a non-descent operation, that is, during cruise or ascent. In this case, valve 25 is open and valve 30 is closed. NEA is distributed first to the center tank 45 and then is communicated via lines 70 to each wing tank 40. Because ambient pressure is dropping during ascent and is typically low at cruise compared to ground level, the NEA is inserted into the center tank 45 at a slightly higher pressure so that the ullage flows via lines 70 into the wings tanks to maintain the proper $O_2$ concentration in the ullage in all the tanks. The flow of ullage and air in the tank are indicated by the arrowheads 85.

I claim:

1. A method for creating ullage in a fuel tank comprising:
porting NEA into a mixing chamber during descent,
exposing said mixing chamber to ambient air and
porting a mixture of NEA and ambient air into said fuel tank;
wherein porting said ambient air into said fuel tank includes the steps of:
porting said mixture to a wing tank and,
porting said mixture from said wing tank to a center tank;
the method further comprising:
porting said NEA to said center tank if not in descent and
porting ullage from said center tank to said wing tank.

2. A method for controlling ullage in at least one fuel tank during operation comprising;
porting NEA into a mixing chamber during descent,
exposing said mixing chamber to ambient air and
porting a mixture of NEA and ambient air into said at least one fuel tank and
porting NEA to said at least one fuel tank during ascent or cruise,
wherein said porting NEA to said at least one tank during ascent or cruise includes the steps of:
porting NEA to a center tank and,
porting said NEA from said center tank to a wing tank.

3. The method of claim 2 wherein said porting said mixture into said at least one fuel tank includes the steps of:
   porting said mixture to a wing tank and,
   porting said mixture from said wing tank to a center tank.

4. Apparatus for creating ullage in a fuel tank comprising:
   a mixing chamber for receiving NEA during descent,
   a port for communicating ambient air with said mixing chamber during descent,
   a port for communicating a mixture of said NEA and said ambient air to said fuel tank,
   a second fuel tank in communication with said fuel tank such that ullage is communicated between said fuel tank and said second tank, and
   a first valve for porting said NEA to said second fuel tank if not in descent.

5. The apparatus of claim 4 further including:
   a second valve for porting said NEA to said mixing chamber during descent.

* * * * *